US007318016B2

(12) United States Patent
Watkins et al.

(10) Patent No.: US 7,318,016 B2
(45) Date of Patent: Jan. 8, 2008

(54) SYSTEM AND METHOD FOR STAGGERING TIME POINTS FOR DEPLOYMENT OF RINGS IN A FIBER OPTIC NETWORK SIMULATION PLAN

(75) Inventors: Kristen L. Watkins, Plano, TX (US); Nandagopal Venugopal, Dallas, TX (US)

(73) Assignee: Verizon Business Global LLC, Basking Ridge, NJ (US)

( * ) Notice: Subject to any disclaimer, the term of this patent is extended or adjusted under 35 U.S.C. 154(b) by 474 days.

(21) Appl. No.: 10/778,021

(22) Filed: Feb. 17, 2004

(65) Prior Publication Data

US 2004/0162718 A1 Aug. 19, 2004

Related U.S. Application Data

(63) Continuation of application No. 09/469,527, filed on Dec. 23, 1999, now Pat. No. 6,763,326.

(51) Int. Cl.
*G06F 9/44* (2006.01)
(52) U.S. Cl. .............................. 703/21; 703/13; 703/19; 709/220; 709/223; 709/224; 370/328
(58) Field of Classification Search .................. 703/13, 703/21; 370/250, 255; 709/226
See application file for complete search history.

(56) References Cited

U.S. PATENT DOCUMENTS

| | | | | |
|---|---|---|---|---|
| 5,204,955 A | | 4/1993 | Kagei et al. .................. | 714/55 |
| 5,295,244 A | | 3/1994 | Dev et al. .................... | 345/853 |
| 5,515,367 A | * | 5/1996 | Cox et al. .................... | 370/404 |
| 5,530,575 A | | 6/1996 | Acampora et al. .......... | 359/128 |
| 5,583,792 A | | 12/1996 | Li et al. ...................... | 709/224 |
| 5,657,142 A | | 8/1997 | Fahim ........................ | 359/110 |
| 5,729,692 A | | 3/1998 | Qiu et al. | |

(Continued)

OTHER PUBLICATIONS

"Network Simulations with OPNET", X. Chang, Proceedings of 1999 Winter Simulation Conference, IEEE 1999.*

(Continued)

*Primary Examiner*—Fred Ferris

(57) ABSTRACT

A system and method for optimizing placement of network equipment and information load in a network over a period of time. A demand input structure having a plurality of demands organized by their time points is provided as an input to a model generator and an optimization processor associated therewith. Starting with the earliest demand set to be serviced by the network, a directed graph network model is obtained by using appropriate transformation techniques. A cost function associated with the network model is constructed using a flow cost term and an equipment cost term. Appropriate constraints are imposed on the cost function for optimization. A solution set comprising network placement information and demand routing information is obtained for a current time point. When the next demand set is taken up for optimization, the network model and associated cost function are recursively updated by using the solution set obtained for the demand set at a prior time point. The recursive optimization process takes place for each of the demand sets provided in the demand input structure in accordance with their time points. Preferably, Priority 1 demands are optimized first. Thereafter, Priority 2 demands are optimized by employing a capacitated shortest path algorithm with respect to each Priority 2 demand presented in its order.

19 Claims, 17 Drawing Sheets

U.S. PATENT DOCUMENTS

| | | | |
|---|---|---|---|
| 5,787,252 A | | 7/1998 | Schettler et al. ............ 709/224 |
| 5,809,282 A | * | 9/1998 | Cooper et al. .............. 709/226 |
| 5,812,530 A | * | 9/1998 | Fernandez et al. .......... 370/250 |
| 5,881,257 A | * | 3/1999 | Glass et al. ................. 712/200 |
| 5,907,696 A | | 5/1999 | Stilwell et al. ............... 703/13 |
| 5,943,244 A | * | 8/1999 | Crawford et al. ............. 703/13 |
| 5,974,127 A | * | 10/1999 | Wernli et al. .......... 379/201.01 |
| 6,085,238 A | | 7/2000 | Yuasa et al. ................. 709/223 |
| 6,094,417 A | * | 7/2000 | Hansen et al. .............. 370/222 |
| 6,141,318 A | * | 10/2000 | Miyao ........................ 370/217 |
| 6,151,305 A | * | 11/2000 | Chen ......................... 370/238 |
| 6,205,413 B1 | | 3/2001 | Bisdikian et al. ............. 703/24 |
| 6,311,144 B1 | | 10/2001 | Abu El Ata .................. 703/2 |
| 6,366,875 B1 | * | 4/2002 | Colizzi et al. ................ 703/16 |
| 6,418,123 B1 | * | 7/2002 | Kawakami et al. ......... 370/254 |
| 6,442,141 B1 | | 8/2002 | Borella et al. .............. 370/248 |
| 6,571,356 B1 | * | 5/2003 | Mehr et al. ................... 714/28 |
| 6,654,354 B1 | * | 11/2003 | Watkins et al. ............. 370/258 |
| 6,763,326 B1 | * | 7/2004 | Watkins et al. ............... 703/21 |
| 6,798,747 B1 | * | 9/2004 | Watkins et al. ............. 370/238 |
| 6,909,700 B1 | * | 6/2005 | Benmohamed et al. ..... 370/255 |
| 2002/0036988 A1 | * | 3/2002 | Cardwell et al. ........... 370/238 |
| 2002/0187770 A1 | * | 12/2002 | Grover et al. ............... 455/403 |
| 2003/0158765 A1 | * | 8/2003 | Ngi et al. ..................... 705/7 |

OTHER PUBLICATIONS

OPNET Modeler product brochure, Mil 3 Inc., 1999, Model Library, Standard Models.*

"Network Planning with a Performance-prediction tool", S.D. Post, International Journal of Network Management, 9, 167-193, 1999.*

"Survivable SONET Networks—Design Methodology", Wasem et al, IEEE Journal on Selected Communications, vol. 12, No. 1, Jan. 1994.*

Menasce, "Capacity Planning and Performance Modeling: From Mainframes to Client Servers", Prentice hall, ISBN: 0-13-035494-5, 1994.

Gannett, "Fast, Efficient Equipment Placement Heuristics for Broadband Switched or Internet Router Networks", White Paper Telcordia Technologies, Jul. 29, 1999.

"Capacity Planning and Performance Modeling: from mainframes to client servers"; D. Menasce; Prentice Hall; ISBN: 0-13-035494-5; 1994.

"Fast, Efficient Equipment Placement Heuristics for Broadband Switched or Internet Router Networks"; J. Gannett; White Paper Telcordia Technologies; Jul. 29, 1999.

* cited by examiner

|   304 | 306 | 308 | 310 |
|---|---|---|---|
| 1 | A | D | 32 |
| 2 | C | F | 36 |
| 3 | B | D | 18 |
| 4 | E | G | 16 |
| 5 | G | A | 20 |
|   |   |   |   |

302 brackets the first row. 300A labels the table.

FIG. 8A

|  | 314 | 316 | 318 |
|---|---|---|---|
| No. | Year-Qtr | Demand | Priority Type |
| 1 | YYYY-Q1 | 20 | 1 |
| 2 | YYYY-Q1 | 32 | 1 |
| 3 | YYYY-Q1 | 18 | 2 |
| 4 | YYYY-Q1 | 24 | 1 |
| ⋮ | ⋮ | ⋮ | ⋮ |
| N-1 |  |  |  |
| N |  |  |  |

Rows 1–4: Time Point 312

|  | No. | Year-Qtr | Demand | MUX Level |
|---|---|---|---|---|
| Time Point 312 | 1 | YYYY-Q1 | 20 | OC-3 |
|  | 2 | YYYY-Q1 | 32 | OC-12 |
|  | 3 | YYYY-Q1 | 18 | OC-48 |
|  | 4 | YYYY-Q1 | 24 | DS-3 |
|  | ⋮ | ⋮ | ⋮ | ⋮ |
|  | N-1 |  |  |  |
|  | N |  |  |  |

SYSTEM AND METHOD FOR STAGGERING TIME POINTS FOR DEPLOYMENT OF RINGS IN A FIBER OPTIC NETWORK SIMULATION PLAN

CROSS-REFERENCE TO RELATED APPLICATIONS

This application is a continuation application of U.S. patent application Ser. No. 09/469,527, filed Dec. 23, 1999, now U.S. Pat. No. 6,763,326 which is incorporated herein be reference. This application discloses subject matter related to the subject matter disclosed in the following co-assigned patent applications: (i) "System and Method for Planning Multiple MUX Levels in a Fiber Optic Network Simulation Plan," filed Dec. 22, 1999, Ser. No. 09/469,691 in the names of: Kristen L. Watkins and Nandagopal Venugopal, and issued on Nov. 25, 2003 as U.S. Pat. No. 6,654,354; and (ii) "System and Method for Time Slot Assignment in a Fiber Optic Network Simulation Plan," filed Dec. 22, 1999, Ser. No. 09/470,666, in the names of: Kristen L. Watkins and Nandagopal Venugopal.

BACKGROUND OF THE INVENTION

1. Technical Field of the Invention

The present invention relates generally to communications networks. More particularly, the present invention relates to a system and method for optimizing the deployment of network elements over a period of time in a network, e.g., a Fiber Optic Network, that routes bandwidth demands having multiple channel rate requirements and variable time points. In addition, the present patent application provides a scheme for routing demands in a Fiber Optic Network using Time Slot Assignment (TSA) technology.

2. Description of Related Art

Installing, maintaining, and upgrading a communications network is very costly. Huge expenditures are involved in deploying suitable network equipment at predetermined locations and establishing transmission paths or conduits therebetween via an appropriate physical medium (or, media). Because of these cost considerations, network operators have to be circumspect about when and where to put in a new network or expand an existing one.

Furthermore, information transport—the primary function of a communications network—needs to be efficiently performed in a network in order to optimize its size so that costs associated with unnecessary expansion of the network, sub-optimal deployment/upgrading of the equipment, etc., for example, are avoided. As is well known, efficient network usage generally implies using available channel capacity or capacities efficiently, in addition to employing techniques that achieve cost-effective routing of information via available network equipment.

It should be readily apparent that there is a need for planning tools that enable network operators and owners to schedule equipment deployment intelligently, especially in light of the aforementioned considerations. In addition, such tools have lately become even more essential because of the ever-increasing need for the deployment of high-capacity networks (thus involving more sophisticated and expensive equipment) capable of transporting a wide variety of information—voice, data, video, multimedia, and the like—at phenomenal transport rates.

Conventional solutions in this regard typically employ mathematical modeling or simulation techniques coupled with optimization procedures to arrive at estimates for placement of network equipment that routes information as efficiently as possible. Although such methodologies represent a significant advancement in the field of communications network modeling, there exist several shortcomings and deficiencies in the state of the art.

First, the existing methods treat demand, a quantified volume of bandwidth requested to transfer information over a network path, as a time-independent parameter, thereby compressing all demands—current and projected—to be serviced by the network to a single point in time. In other words, all network equipment required to satisfy both current and projected demands is treated as operational at a single instance. Those skilled in the art should readily recognize that while such a technique may yield a "good" first approximation, it is nevertheless unsatisfactory for accurate planning purposes where new network portions (e.g., rings) are built in a phased manner across the life of a deployment plan, typically stretching over several quarters or years.

Further, as a by-product of treating demands as time-invariant entities, resultant mathematical formulations become formidable because, typically, several hundreds of thousands of demand quantities—including demand forecasts—need to be optimized (that is, demands to be optimally routed in a network) over a deployment plan. Computation loads therefore become enormous, leading to critical time delays in obtaining results which often tend to be unstable because of the unwieldy modeling efforts.

In addition, the existing solutions typically consider only a single type of channel bandwidth for the demand quantities that need to be optimized. Moreover, the channel rate thus considered is oftentimes a lower rate, thereby necessitating decomposition of demands of higher channel bandwidth rates into equivalent demand units of the lower rate used. However, no controls are implemented to ensure that these equivalent lower rate demands are routed together on the same network paths or to the same intended destinations. Clearly, such routing is unacceptable and is only a poor approximation of the actual routing loads in the network.

Yet another drawback in the current network-planning methodologies is where the underlying modeling apparatus does not accurately reflect today's network transport technology. For example, where Fiber Optic Network rings are implemented, current solutions yield results which are not compatible with the transport technology that is widely deployed.

SUMMARY

Accordingly, the present invention advantageously provides a system for deploying network equipment with staggered time points in a network such that demand routing therein is optimized. A demand input structure having a plurality of demands organized by their time points is provided as an input to a model generator and an optimization processor associated therewith. Starting with the earliest demand set to be serviced by the network, a directed graph network model is obtained by applying appropriate transformation techniques to the network's topology. A cost function associated with the network model is constructed using a flow cost term and an equipment cost term. Appropriate constraints are imposed on the cost function for optimization. A solution set comprising network placement information and demand routing information is obtained for a current time point. When the next demand set is taken up for optimization, the network model and associated cost function are recursively updated by using the solution set obtained for the demand set previously. The recursive optimization process takes place for each of the demands provided in the demand input structure in accordance with their time points. Preferably, Priority 1 demands are optimized first. Thereafter, Priority 2 demands are optimized by employing a capacitated shortest path algorithm with respect to each Priority 2 demand presented in its order.

In another aspect, the present invention is directed to a network planning method for optimally deploying network equipment in a network over a period of time. The method provides a demand input structure having a plurality of demands to be serviced by the network, wherein each demand is associated with a corresponding time point. Preferably, the demands are sorted by their time points. Starting with a demand set having the earliest time point, a recursive model building and optimization process is engaged for each of the time points. First, the network is transformed into a network model, preferably using certain transformation techniques available in the art. An optimization problem is constructed for the network model to minimize a cost function associated therewith. Thereafter, the optimization problem is solved using known integer programming techniques. Network equipment placement information and demand routing information are obtained as a solution set from the optimization process. After examining and analyzing the solution set information, the network model and associated cost function are updated for optimizing the next demand set in the demand input structure. These steps are repeated for all Priority 1 demands which are optimized first. Thereafter, Priority 2 demands, if any, are optimized by using a capacitated shortest path algorithm. Accordingly, a schedule for successive deployment of the network equipment in the network may be planned based on the network equipment placement information obtained for each of the time points.

BRIEF DESCRIPTION OF THE DRAWINGS

A more complete understanding of the present invention may be had by reference to the following Detailed Description when taken in conjunction with the accompanying drawings wherein:

FIGS. 8A through 8C illustrate input information in a tabular structure for demands to be optimized in accordance with the teachings of the present invention;

DETAILED DESCRIPTION OF THE DRAWINGS

Figure 1:
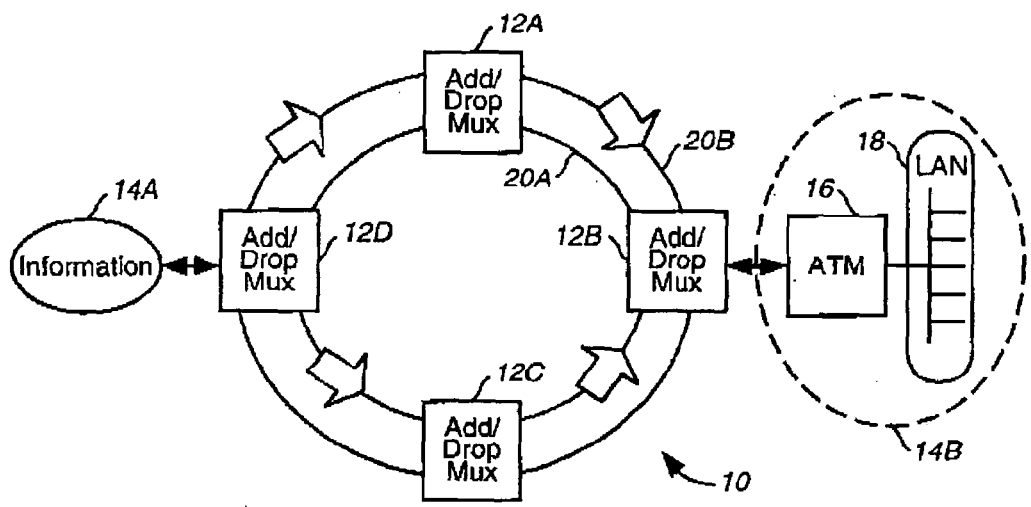
FIG. 1 depicts a functional block diagram of a SONET-based network ring wherein the teachings of the present invention may be advantageously employed.

In the drawings, like or similar elements are designated with identical reference numerals throughout the several views, and the various elements depicted are not necessarily drawn to scale. Because the teachings of the present invention are particularly exemplified with the deployment of Synchronous Optical NETwork (SONET)-based Fiber Optic Networks, a brief description of the SONET technology is provided hereinbelow for immediate reference.

Referring now to FIG. 1, depicted therein is a functional block diagram of a SONET-based network ring 10 wherein the teachings of the present invention may be advantageously employed. SONET is a physical layer technology designed to provide a universal transmission and multiplexing scheme, with transmission rates in the gigabit per second range, and a sophisticated operations and management system. This technology is standardized by the American National Standards Institute (ANSI) as T1.105 and T1.105.xx specifications. A companion technology, the Synchronous Digital Hierarchy (SDH), is standardized by the International Telecommunications Union (ITU) (Recommendation G.707), and is very similar to SONET, except that its multiplexing hierarchy is a subset of SONET's hierarchy. Accordingly, the following discussion will focus primarily on SONET but it should be readily understood by those of ordinary skill in the art that the concepts apply to SDH as well.

SONET is typically deployed over optical fiber in a ring configuration to support bi-directional or uni-directional traffic. FIG. 1 exemplifies a two-fiber Bi-directional Line Switched Ring (BLSR) comprised of fibers 20A and 20B. Each fiber contains protect channels which enable fault tolerance. When a failure occurs, protection switching moves traffic from working channels to protect channels. Network elements such as Add/Drop Multiplexers (ADMs), exemplified by ADMs 12A-12D in this FIG., insert and remove user payload originated from associated information sources/destinations. For example, two such information points, 14A and 14B, are shown, each of which may typically comprise a suitable Point of Presence (POP) switch such as an Asynchronous Transfer Mode (ATM) switch 16 connected to a Local Area Network (LAN) 18 and the like. The ADMs multiplex (or "mux") the received information into suitable SONET frames circulating in the ring in a pre-defined fashion.

Figure 2:
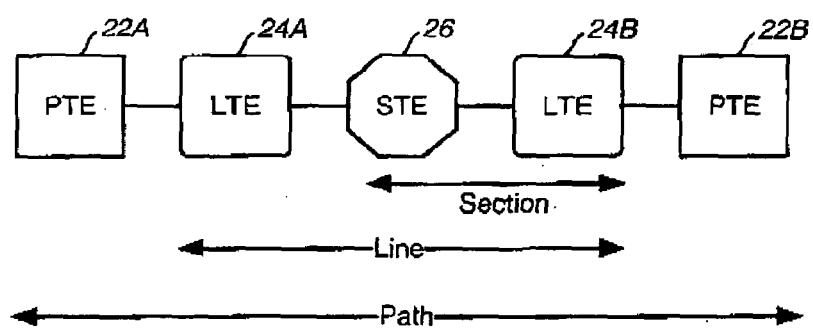
FIG. 2 depicts a plurality of network components for use with a SONET ring.

FIG. 2 depicts a plurality of network components for use with a SONET ring, e.g., ring 10 set forth above. Typically, Path Terminating Equipment (PTE) (denoted by reference numerals 22A, 22B) converts non-SONET signals into an STS-1 frame. Line Terminating Equipment (LTE) (denoted by reference numerals 24A, 24B) typically functions as an ADM at a network site and operates as a hub that provides multiplexing, synchronization and protection switching. Section Terminating Equipment (STE) (denoted by reference numerals 26) acts as a repeater that also provides frame alignment, scrambling, and error monitoring. To manage the flow of SONET frames through these network elements, overhead bytes are added to the SONET frame structure as discussed below.

Figure 3:
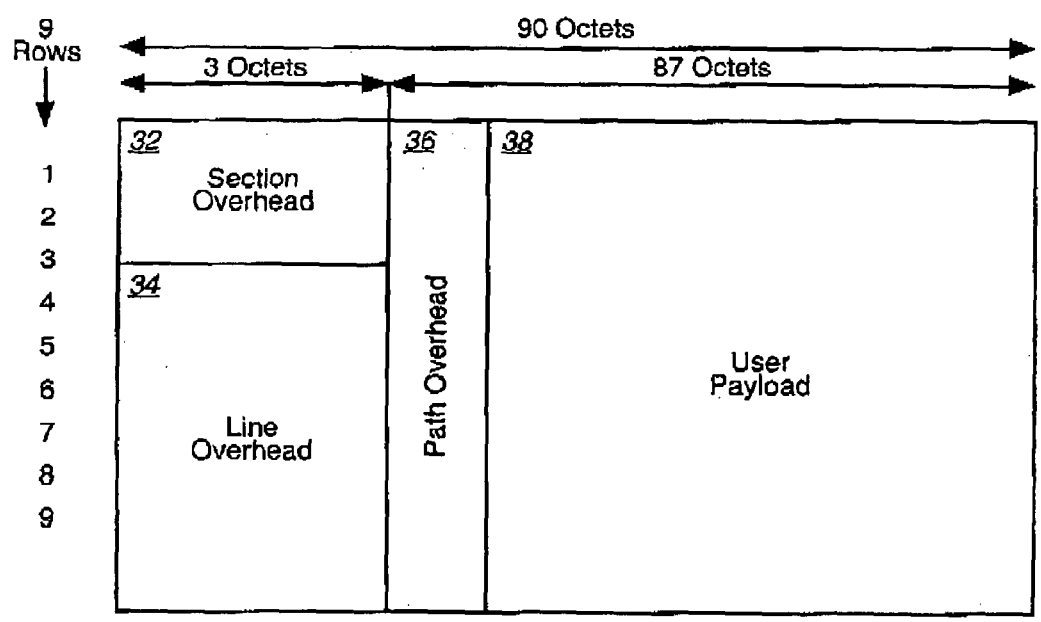
FIG. 3 is a frame structure used for transporting information over an exemplary SONET ring.

FIG. 3 depicts a frame structure 30 used for transporting information over an exemplary SONET ring. The SONET frame 30, logically organized as a two-dimensional array of bytes, is transmitted synchronously once every 125 microseconds. Typically, the size of the frame 30 depends on the channel rate. The basic SONET channel is a Synchronous Transport Signal-1 (STS-1) which is comprised of frames that have 810 bytes organized in 9 rows by 90 columns. At 8000 frames per second, a channel rate of 51.840 Mbps is obtained for the basic STS-1 channel.

It should be readily apparent that the frame 30 shown in FIG. 3 corresponds to an STS-1 frame. A section overhead 32 and line overhead 34, cumulatively comprising three of the 90 columns, are provided for managing SONET line and section equipment. The payload, called the Synchronous Payload Envelope (SPE), includes the path overhead 36 of one octet, leaving the remaining 86 octets for the user payload 38. Accordingly, it can be readily seen that for a basic STS-1 channel, a user data rate is computed as 86 (octets)×9 (rows)×8000 (frames per second) which equals 49.536 Mbps.

Data rates higher than STS-1 are obtained by multiplexing multiple STS-1 signals. For example, three STS-1 signals can be byte-interleaved to form an STS-3 signal that operates at 155.52 Mbps. Another form of multiplexing is to concatenate the overhead and payload bytes of multiple STS-1 signals. For example, an STS-3c frame contains nine overhead columns (for section and path overhead) and 261 (87×3) columns for the SPE. However, the operating rate is the same at 155.52 Mbps. An exemplary SONET multiplexing hierarchy is shown in the following table:

TABLE I

| ELECTRICAL SIGNAL | OPTICAL SIGNAL | GROSS RATE (MBPS) | USER RATE (MBPS) |
| --- | --- | --- | --- |
| STS-1 | OC-1 | 51.84 | 49.536 |
| STS-3 | OC-3 | 155.52 | 148.608 |
| STS-12 | OC-12 | 622.08 | 594.432 |
| STS-48 | OC-48 | 2488.32 | 2377.728 |

Similarly, higher multiplexing levels (or, MUX levels) of data rates may be obtained. STS-n is an n-MUX level electrical signal which, when modulated over an optical carrier (OC), is referred to as an OC-n optical signal.

Transmission rates lower than STS-1 can be obtained by subdividing the payload into Virtual Tributaries (VT) which can support data rates from DS-1 (Digital Signal Level 1 operating at 1.544 Mbps) to DS-3 (at 44.736 Mbps). VTs are useful when a SONET ring interfaces with another network based on the Pleisochronous Digital Hierarchy (PDH) which is built upon DS-0 (64 Kbps) channels.

Network elements, e.g., ADMs, may typically be provided with an appropriate number of necessary ports or slots for supporting different channel rates. For example, an ADM coupled to an OC-12 ring path can operate with an OC-12 signal if at least 12 contiguous or adjacent high speed slots are available thereat.

Figure 4:
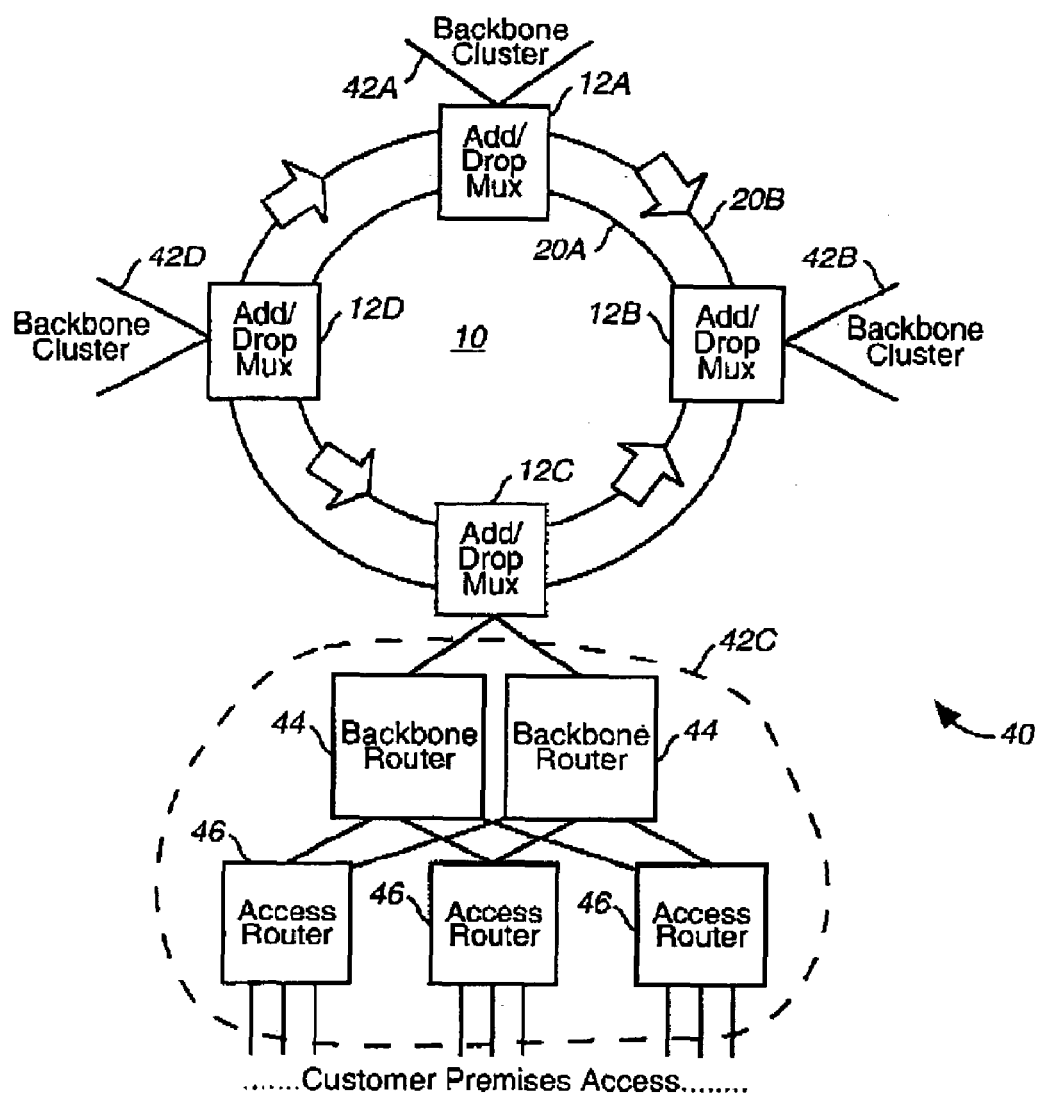
FIG. 4 depicts another exemplary embodiment of a SONET ring for practicing the teachings of the present invention.

Referring now to FIG. 4, depicted therein is another exemplary embodiment of a SONET ring used in connection with Internet Protocol (IP)-based backbone clusters operating as information points. A broadband backbone network 40 is formed from a SONET ring 10 wherein each ADM is coupled to a backbone cluster. Reference numeral 42C denotes a representative backbone cluster comprised of one or more backbone routers (reference numeral 44) which, in turn, are coupled to several access routers (reference numeral 46) for providing customer premises access.

The SONET technology is also utilized in high-speed voice, video and multimedia Fiber Optic Networks. A discussion of such networks also provided hereinbelow. Furthermore, because it is believed that the teachings of the present invention may be advantageously practiced to their fullest extent by employing certain techniques available in applied mathematics (more particularly, operations research), concepts pertaining to network simulation and optimization are also set forth below. In the field of operations research, and specifically network programming, terms such as "demand", "supply", and "commodity" have clearly defined, commonly understood meanings. In the discussion that follows, the term "demand" is used to refer to a quantified volume of bandwidth requested in order to transfer information among specific sites within a network. One of the inputs to the optimization process of the present invention is a list of communications "demands" requested of the network. In the mathematical model representing the network, the term "commodity" is used in an analogous fashion to represent the quantifiable entity that flows along directed arcs within the model provided in accordance with the teachings of the present invention.

Figure 5:
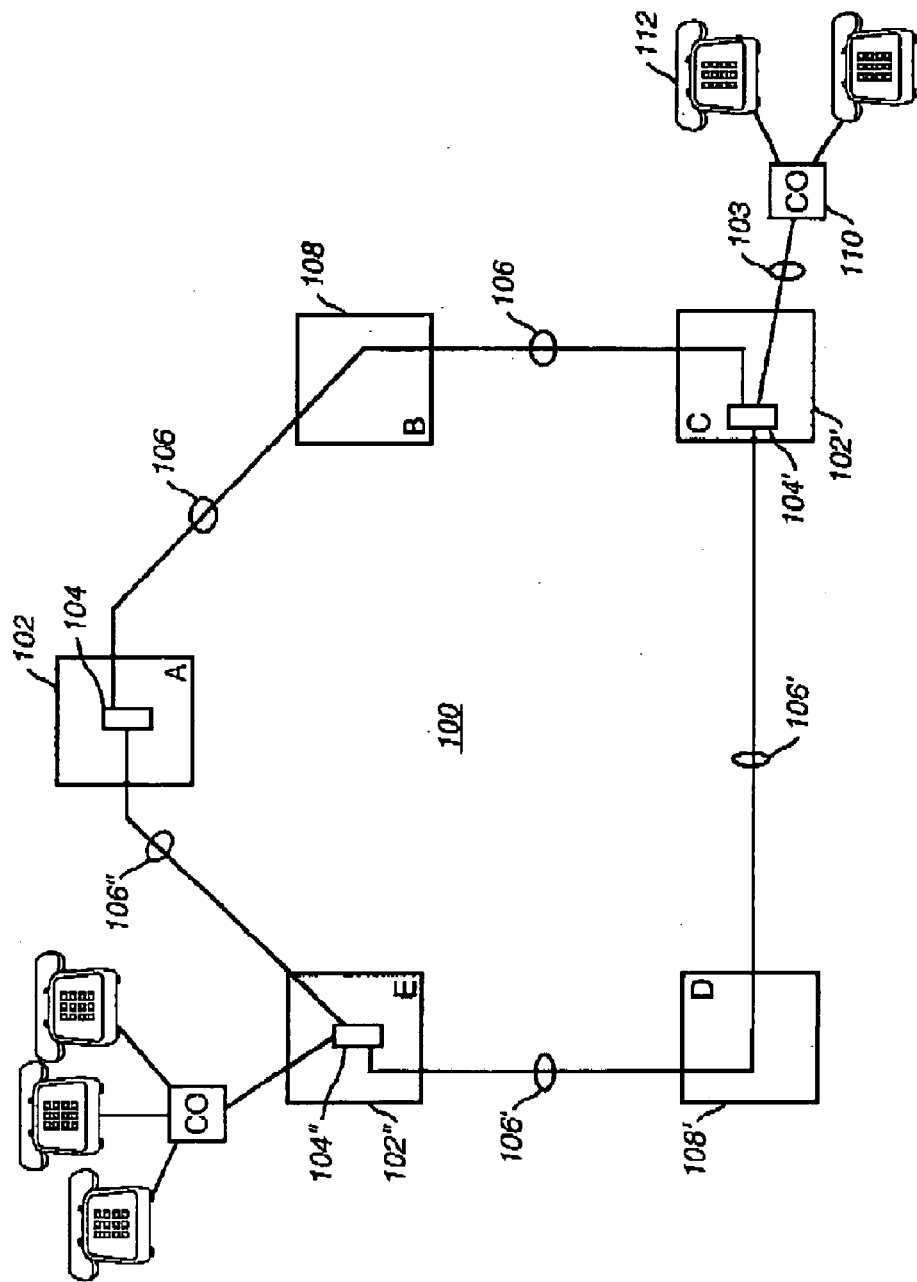
FIG. 5 depicts a functional block diagram of yet another exemplary SONET-based Fiber Optic Network wherein the teachings of the present invention may be advantageously employed.

Referring now to FIG. 5, an illustrative Fiber Optic Network (i.e., network 100) is shown comprising site A 102, site C 102' and site E 102", in addition to certain "passthrough" sites. Tree spans or paths, which cumulatively form the network 100, interconnect the sites: A-C span 106, C-E span 106' and E-A span 106". Also, each of the spans comprises at least one link. The span 106 between site A 102 and site C 102' passes through a site B 108 without being modified or switched. The site B 108 is, therefore, referred to as a passthrough site. A site D 108' is another passthrough site provided in the network. In practice, there may be a fiber splice, connector, or even a regenerative repeater at a passthrough point, but the sites B 108 and D 108', in general, are not a source, destination, or branching point of any signals in the links 106 and 106'.

The sites A 102, C 102' and E 102" of the network 100 include ADMs 104, 104' and 104", respectively. Those of ordinary skill in the art should realize that these ADMs are essentially similar to the ADM components discussed hereinabove with respect to the SONET ring topology. Accordingly, the ADMs 104, 104' and 104" preferably operate as points of ingress and/or egress for information transported by the network 100. In applying such network 100 to telephony, for example, the ADM 104' may be connected to a telephone Central Office (CO) 110 that serves telephone subscribers 112 in the vicinity of the site C 102'. The ADM 104' serves as a point where the tributary data stream 103 from the CO 110 feeds into the high data rate communications taking place within the network 100.

Figure 6:
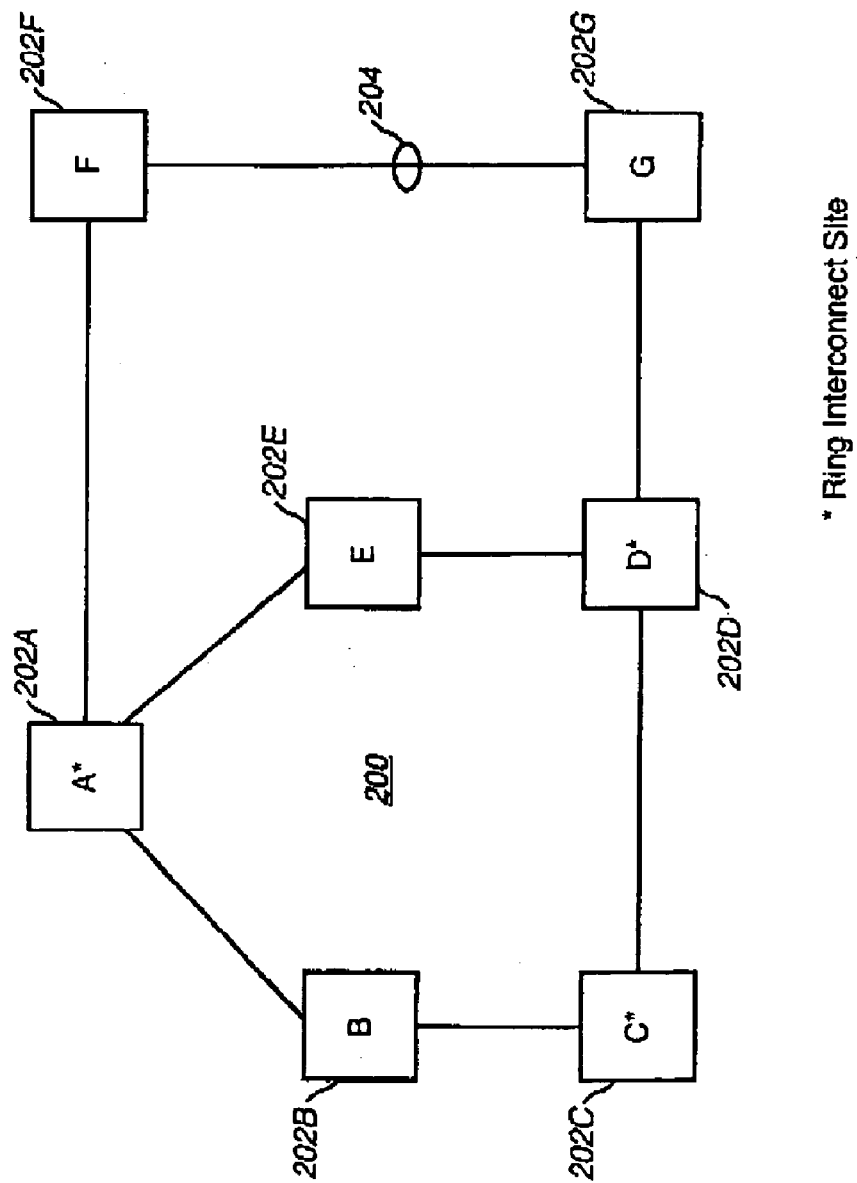
FIG. 6 depicts a functional block diagram of a still further exemplary embodiment of a Fiber Optic Network.

FIG. 6 shows another exemplary network 200, in accordance with the teachings of the present invention, comprising seven sites A through G denoted as 202A-202G, respectively. Multiple spans, as shown by a representative span 204, join sites 202A through 202G in the network 200. Each span is depicted by a single line in this FIG., although any of the spans may comprise at least one link, in addition to fail-over span paths. Sites 202A, 202C and 202D are designated with an asterisk ("*") to indicate that they are sites at which equipment exists to allow interconnection of rings or crossover of information from one ring to another. This aspect of the network 200, i.e., the provision of the interconnection equipment for crossover of information from one ring to another, serves as input information to transformation processing described hereinbelow.

Figure 7:
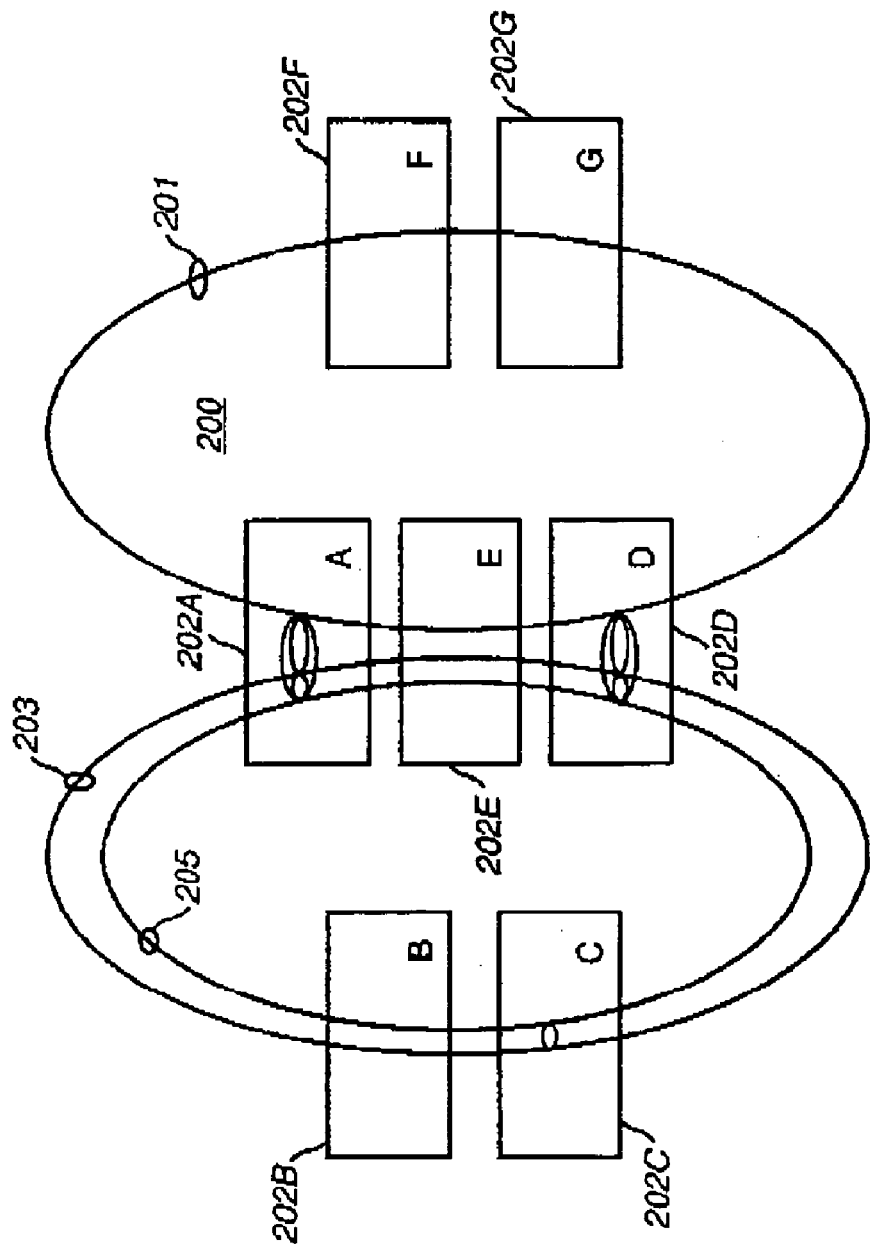
FIG. 7 illustrates exemplary ring topologies associated with the network exemplified in FIG. 6.

Another input to the transformation processing in accordance with the present invention is the ring configuration of the network 200. FIG. 7 depicts another aspect of the network 200 identifying the topological ring configurations with respect to the present illustrative example. The network includes three rings 201, 203 and 205: two rings 203 and 205 traversing sites A-B-C-D-E-A, and one ring 201 along A-E-D-G-F-A. One of the two rings 203 and 205 represents an additional "layer" or "overbuild" of the other; however, for the purposes of network modeling, they are treated as topologically (and mathematically) distinct network rings. In the network 200, all three rings 201, 203 and 205 may preferably be implemented as two-fiber, bi-directional line switched rings (BLSRs). It should also be noted that the ring interconnection equipment at sites 202A, 202C and 202D is illustrated in this FIG.

Referring now to FIGS. 8A through 8C, another input in accordance with teachings of the present invention is illustrated in a tabular data structure. Preferably, this input information pertains to the requirements for communications volume (i.e., demand and its type) that an exemplary network e.g., the network 200, is expected to provide among its sites (e.g., sites 202A through 202 G) over a period of time.

In particular, the demand input information may comprise a demand table 300A (depicted in FIG. 8A) applicable to the network 200 for illustrative purposes only. The demand table 300A exemplifies a suitable format for expressing demand as an input to the optimization process of the present invention. For each demand entry 302 illustrated as a row in the demand table 300A, there exists an index 304 (a serial or sequential number, for example) that may also be used as a commodity identifier in the mathematical model during processing. Each entry 302 also includes a source or supply site identifier 306, a destination or demand site identifier 308, and a demand quantity 310. For example, the top-most entry in the demand table 300A (i.e., entry with index 1) indicates that in the network 200, 32 units of communication capacity (e.g., a particular MUX level, OC-3, OC-12, DS-3, and the like) are needed to be transported from the site A to the site D.

A Fiber Optic Network arrangement may be optimized in terms of load balancing and equipment placement (e.g., ADMs) at network sites by utilizing a static demand table such as the table 300A described hereinabove. For example, U.S. Pat. No. 5,657,142 to Fahim, incorporated by reference herein, describes a method for optimal allocation of multiplexing equipment and distribution of load in a network using a demand table such as the table 300A.

Those skilled in the art should readily appreciate that although such a technique as described in Fahim may yield useful results, it does not comprehend the time-dependency of the various bandwidth demands that the network must be able to provide. That is, not all demands are to be met at the same time by the network and, accordingly, not all network equipment (e.g., ADMs) or network paths such as rings and spans need to be "turned up" or rendered operational at the same instance. Furthermore, the optimization scheme provided in Fahim does not address the issue of optimally routing demands with multiple MUX levels in a network. Accordingly, it should be apparent that the Fahim approach is somewhat limited and is beset with some of the shortcomings and drawbacks described in the Background section of the present patent application.

FIGS. 8B and 8C depicts exemplary demand input tables (or other data structures) 300B and 300C, provided for illustrative purposes only, that may be advantageously superimposed on, or coupled with, a static demand table structure (e.g., table 300A) in accordance with the teachings of the present invention. As shown in these tables, several additional parameters are introduced as inputs to the network model which, in a presently preferred exemplary embodiment of the present invention, comprises essentially the same model as described in Fahim. Although the teachings of the Fahim patent are incorporated herein by reference, appropriate modeling details will be briefly reviewed hereinbelow, especially in reference to the detailed description of the optimization schemes provided in FIGS. 9A-9B, FIGS. 10A-10B, and FIGS. 12A-12C.

In FIG. 8B, the demand input table structure 300B introduces a time point variable 314 associated with all the demand quantities (such as those set forth in table 300A and denoted with reference numeral 316 here) for the purpose of optimizing the network on the basis of when the demands need to be fulfilled. Preferably, the demand quantities 316 are sorted such that demands with earliest time points are taken up first for the purpose of network optimization and, accordingly, the entries in the time point variable 314 are organized in the ascending order. Also, as a further aspect of the present invention, the demand quantities 316 are associated with a Priority Type variable so as to identify whether the demands are Priority 1 type demands or Priority 2 type demands. Preferably, Priority 1 demands are those which can trigger a new ring layer or overbuild to support them, if necessary. On the other hand, Priority 2 demands are routed on available capacities as "fillers" and cannot trigger a new overbuild by themselves. Typically, the demands—whether actual or forecast—may be sorted by year ("YYYY") and by quarter ($Q_i$, i=1→4). It should be apparent to those skilled in the art that a particular time point, e.g., time point 312, may include several demand quantity entries that need to be optimized for routing and/or load balancing because various MUX levels and Priority types may typically be involved with respect to that time point. As will be described in greater detail hereinbelow, the optimization process of the present invention considers all the demands having the same particular time point together and routes them optimally on the rings which include ADMs currently or potentially available at that time point.

The demand input table structure 300C illustrated in FIG. 8C is similar to the structure 300B described in the foregoing, except that it includes an additional variable, i.e., a MUX level variable 320, associated with the demand quantities 316. The demand quantities are now identified as to their capacity requirements, e.g., OC-3, OC-12, DS-3 and the like. Furthermore, a time point may include several demands of the same MUX level as well. Thus, for example, there may exist multiple OC-3demands, multiple OC-12 demands, etc., at same time point 312.

Although the demand input table structure 300C does not explicitly indicate a Priority Type variable, it should be readily appreciated by those of ordinary skill in the art that such a variable may be advantageously provided in this demand input table also. In addition, it should be clear upon reference hereto that the time point variable, Priority Type variable, and MUX level variable may be provided in any combination thereof by combining structures 300A, 300B and 300C in any known manner to arrive at one or more suitable demand input structures. Furthermore, other demand-related variables, known or hitherto unknown, that may have some significance as to the deployment of the network equipment may also be provided as additional refinements to the demand input structures exemplified herein. Accordingly, for the purposes of the present invention, the term "demand input structure" encompasses an input structure which includes, for each demand quantity, all or any suitable combination/s of the variables and other such refinements as discussed herein. The description set forth in greater detail hereinbelow provides an optimization scheme wherein multiple MUX demands, preferably those at the same time point, are routed optimally over the network as it is dynamically re-configured one time point to the next in accordance with the teachings of the present invention.

Figure 9A:
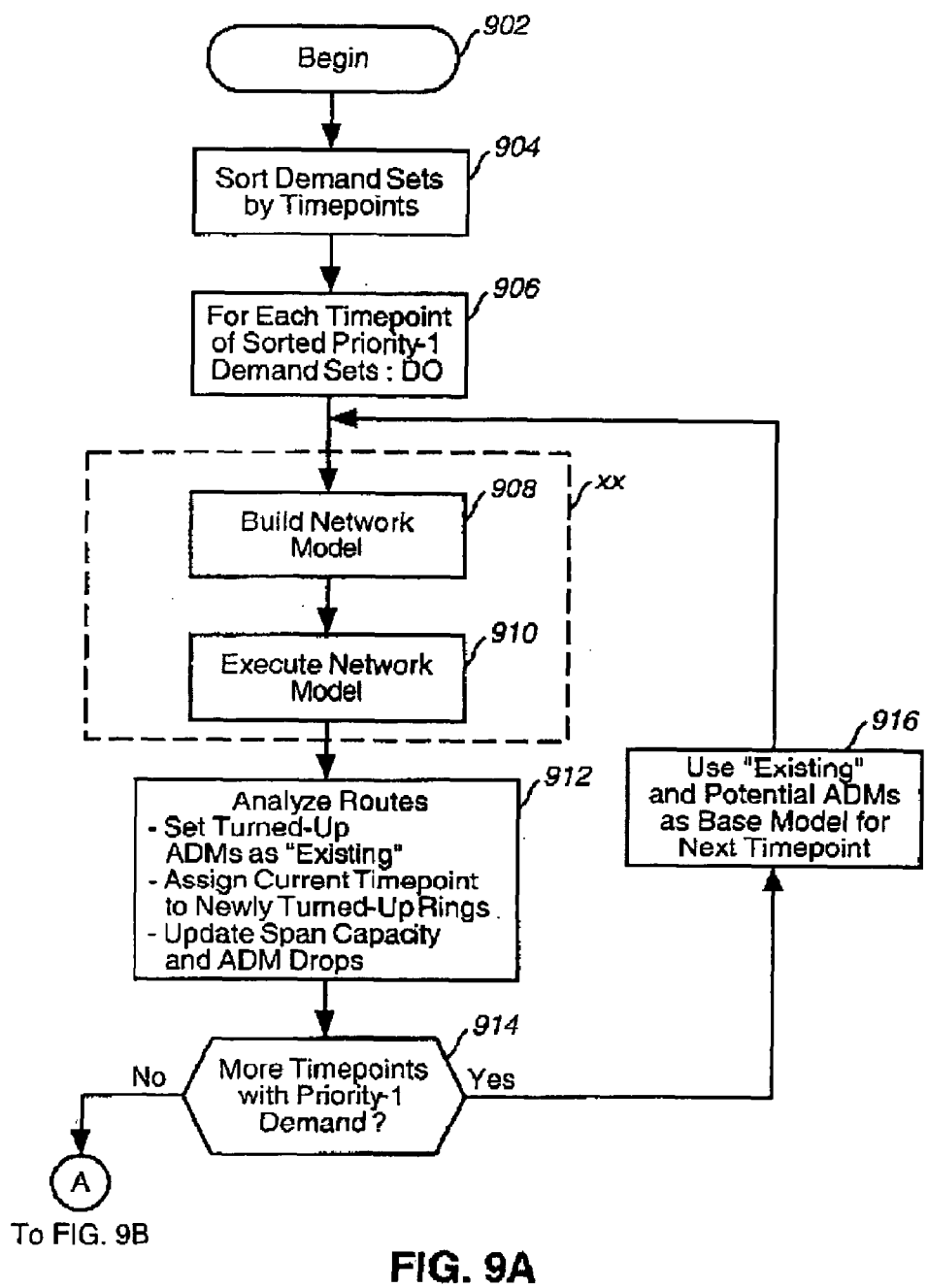
FIGS. 9A-9B depict a flow diagram of an exemplary method for staggering time points with respect to the deployment of rings (e.g., SONET rings) or network equipment in a Fiber Optic Network.
Figure 9B:
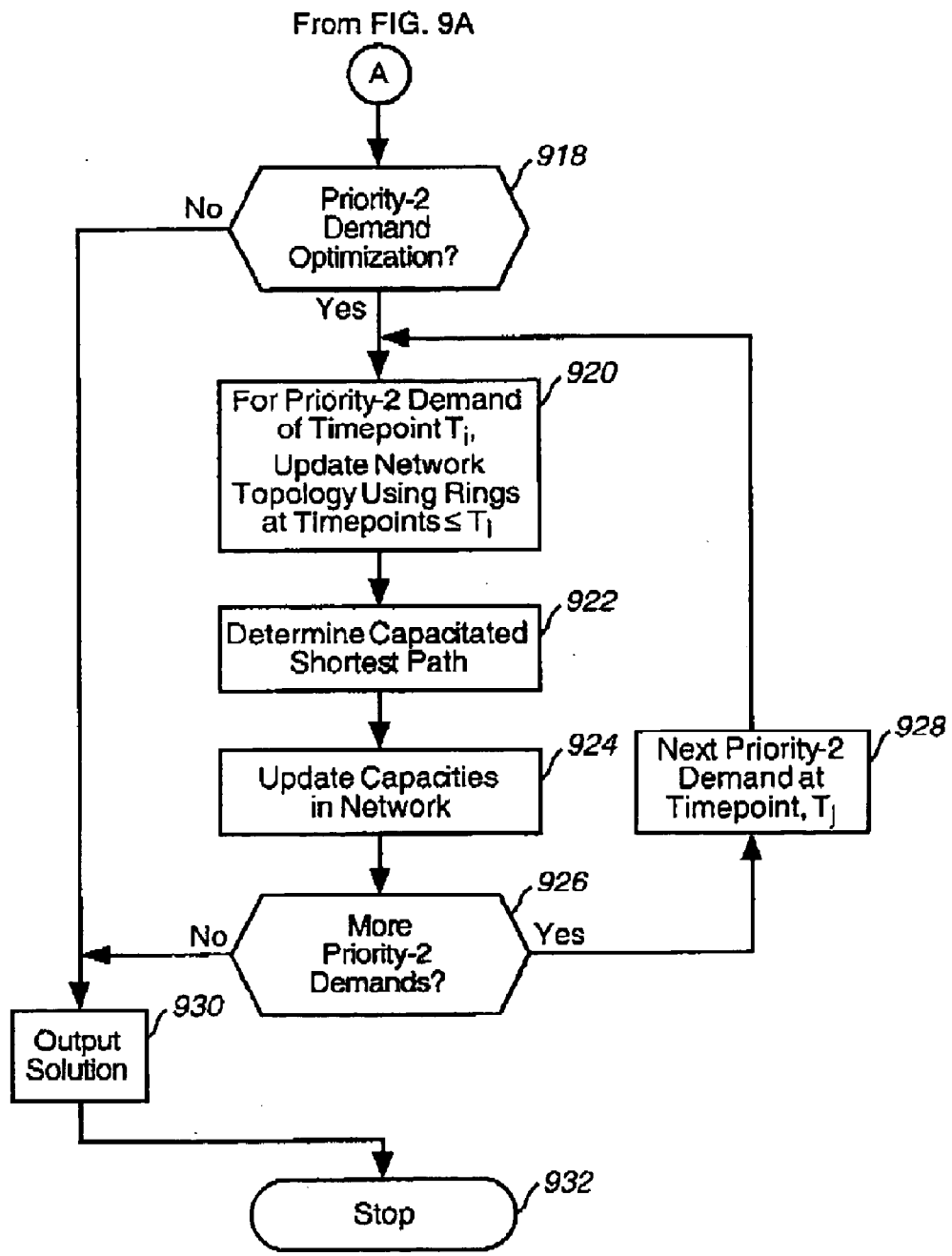

Referring now to FIGS. 9A-9B, depicted therein is a flow diagram of an exemplary method for optimizing the deployment of network rings (and network equipment, e.g., ADMs) so as to optimally route demands having different time points. Upon beginning the optimization process (step 902), demand sets are sorted by their time points (step 904) such that one or more suitable demand input structures (e.g., structures 300A-300C described above) are available as input information to the network modeling process. Thereafter, for each time point, the modeling process is effectuated recursively (step 906) as set forth below. Furthermore, the demand optimization process is preferably implemented to optimize Priority 1 demands first at each time point until all time points are processed.

If the optimization process starts with an existing ring, the ADMs located at the ring nodes may be categorized as "existing" so as to indicate that these ADMs have already been paid for and are preferred for routing. On the other hand, any new ADMs that are planned to be deployed in additional ring spans may be categorized as "potential" which will incur a one-time setup cost. At the beginning of the recursive optimization process, the existing ADMs form one or more "base" rings of the initial network configuration—which may also include potential rings—for the network modeling.

A network model is then built (step 908) such that when the first demand set (i.e., demand set with the earliest time point) is taken up, the existing ADMs are activated or turned up by setting the upper and lower bounds on an integer decision variable (preferably a binary variable) associated with them to 1. Thereafter, the network model is executed (step 910) to arrive at a solution set which preferably comprises the optimum distribution of various commodities along different arcs of a directed graph associated with the network rings as derived in the network model building step (step 908). Also, the solution set may preferably comprise integer decision variables that have a binary value of 1 to indicate where network equipment (e.g., an ADM) is or should be installed in order to meet the demand routing for the particular time point.

The routes obtained in the solution set are then analyzed (step 912). Any potential ADMs used in the current iteration are marked as "existing" and the newly turned up rings are assigned the current time point. In addition, the available capacities on the ring spans and ADM drops are adjusted or updated to account for the usage by the current demand set. Thus, it should be realized that the time points of the rings and the demand sets are maintained in a synchronized fashion (such that the newly turned up rings operate as base rings when the next demand is taken up and, accordingly, the network model itself is recursively re-configured) as the optimization process goes through all time points in the demand input structure.

The optimization process then determines if there are additional time points (with associated Priority 1 demands) (decision block 914) at for which the demand quantities need to be optimally routed. If so, the newly turned up ring or rings in the prior iteration are used as the base network model and the demand at the next time point is subsequently taken up for optimization using the new base rings as well as any potential rings planned for that time point (step 916). The network model is rebuilt for the new set of demands so as to reflect load balancing by the previous demands, and all ADMs marked as existing are turned up by forcing the bounds of the corresponding integer variable to 1. This recursive process is repeated for each time point in the demand input structure.

Once all Priority 1 demands have been optimized, the process determines if there exists Priority 2 demands that need to be routed (decision block 918). If there are no Priority 2 demands, the optimization process provides suitable outputs (e.g., routing reports, demand allocation and/or loading tables or charts, time-based deployment of ADMs, ring utilization reports, ADM configuration reports and other means of user interfacing) (step 930) before exiting. At this point the optimization process is complete and the process control flow stops accordingly (step 932).

If Priority 2 demands exist, on the other hand, they are taken up in their given order and are typically not allowed to trigger new rings or overbuilds (i.e., they fill up whatever unused capacity gaps exist in a network). Only those rings are visible for routing such demands whose time points are earlier than or equal to the time point of the Priority 2 demand set being considered.

Accordingly, as shown in step 920, another process loop is set up for routing the Priority 2 demands in their given order, whether or not sorted by their time points, as long as the time points of the rings used for routing are earlier than or equal to the demand sets' time points. Preferably, a capacitated shortest path method is used for routing the demands (step 922) and, thereafter, the capacities in the network are suitably updated (step 924). If additional Priority 2 demands exist, they are then taken up (step 928) in a recursive manner as set forth above.

Upon completing the processing of the Priority 2 demands, the optimization method preferably provides suitable reports, digitized outputs, etc. (step 930), as described in the foregoing with reference to Priority 1 demands. Once again, the optimization method's process control flow stops subsequently (step 932).

Figure 10A:
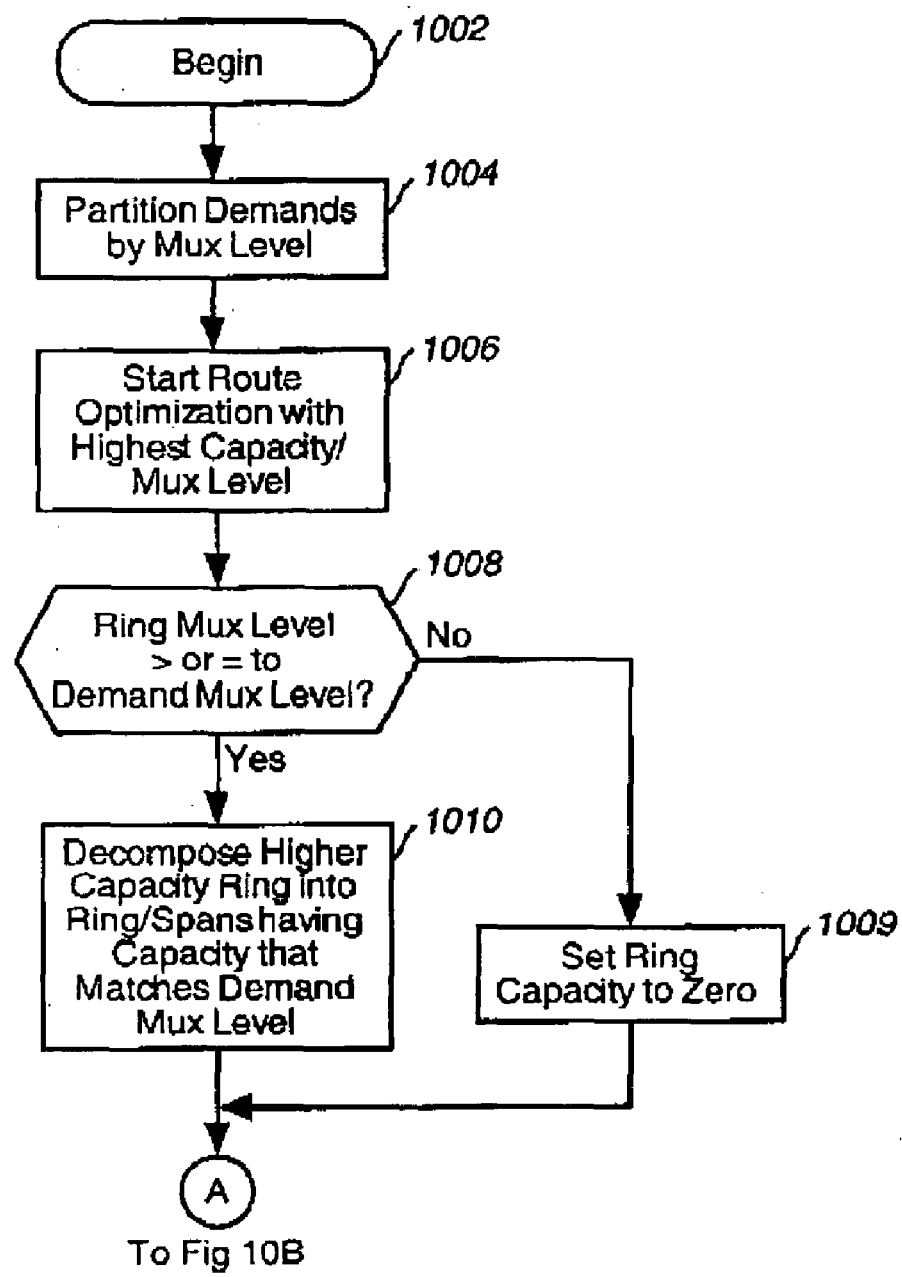
FIGS. 10A-10B depict a flow diagram of an exemplary method for optimizing multiple MUX levels of demand in a SONET-based Fiber Optic Network.
Figure 10B:
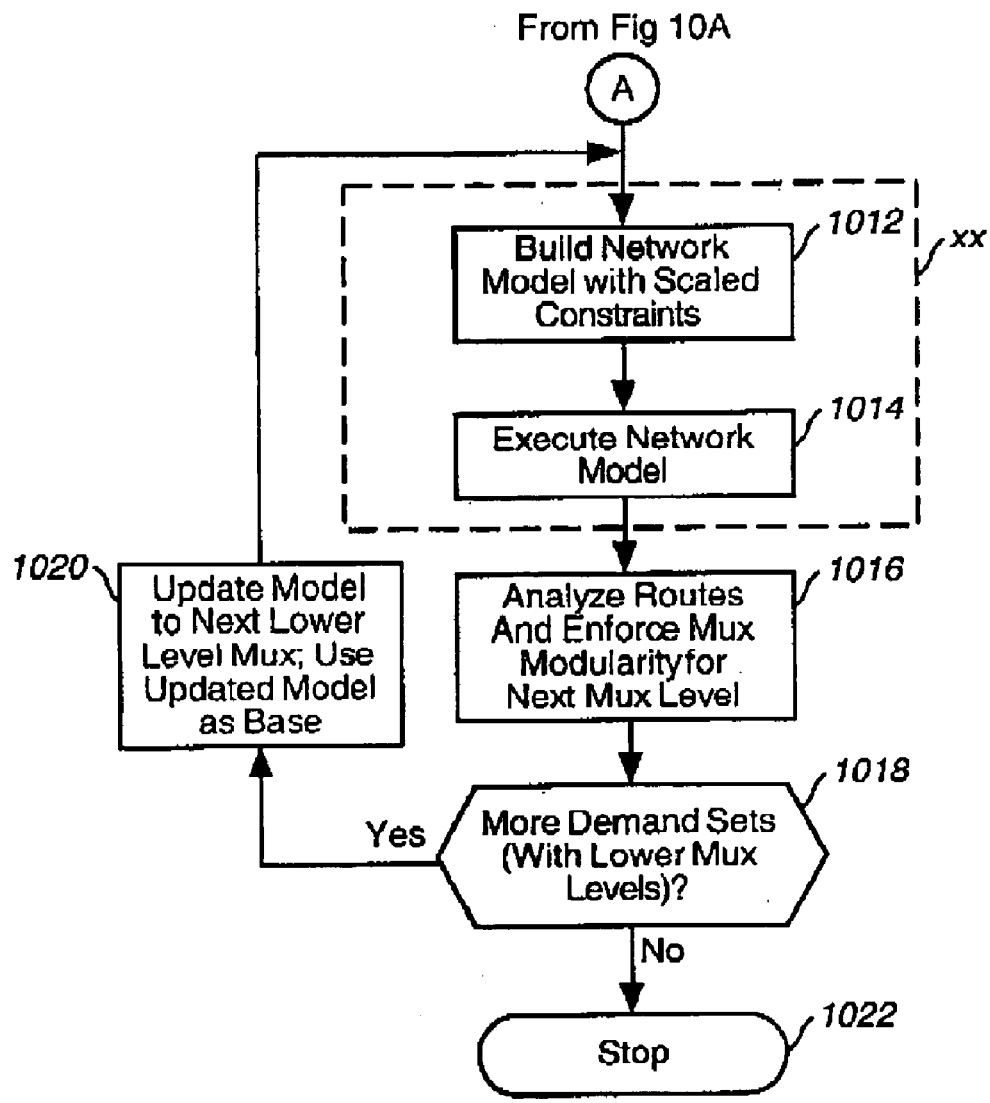

Referring now to FIGS. 10A-10B, a flow diagram of an exemplary method is illustrated for optimally routing multiple MUX levels of demand in a SONET-based Fiber Optic Network. A demand input structure, for example, the structure 300C of FIG. 8C described hereinabove, may be advantageously utilized for providing relevant input information to the optimization process. In a presently preferred exemplary embodiment of the present invention, the demand input information may be sorted by the demand time points as well as the MUX levels of the demand sets. However, one of ordinary skill in the art should readily appreciate that MUX levels for all time points may be considered together (that is, demands have no time points or the time points are not considered—only MUX levels are provided) for optimization purposes within the scope of the present invention. Furthermore, a Priority Type variable may also be utilized for the purpose of accurately modeling different demands types. Accordingly, although the exemplary embodiment of the optimization method illustrated in FIGS. 10A-10B does not explicitly show network optimization by the time points or Priority Type of the demands, it should be clear that by employing the teachings set forth hereinabove with respect to FIGS. 9A-9B, a time-point optimization process loop may be added herein also. Essentially, the optimization process then comprises a double loop where the outer loop operates on the time points and the inner loop on the MUX levels. For each time point, the different MUX levels are considered one at a time and a recursive optimization process optimizes the routes for all demands of a particular MUX level at that time point. Again, once the Priority 1 demands are optimized, the Priority 2 demands may be taken up, one at a time, in their input order.

Continuing to refer to FIGS. 10A-10B more particularly, upon beginning the optimization process (step 1002), the demand sets are partitioned by their MUX levels and sorted preferably in the descending order (step 1004) (and by their time points if so indicated). The network topology is preferably filtered to consist of only those rings whose capacity level is greater than or equal to the MUX level of the current demand set. It should be appreciated that the reason for starting the optimization process with the highest level MUX within a time point is to increase the likelihood of finding suitable open capacities on the ring spans that can accommodate the high bandwidth requirements. This is so because higher MUX demands require more open contiguous slots at the ADM level and such slots might be used less optimally by lower MUX demands if they were routed first. Accordingly, while determining the available span capacity, the correct slot modularity (i.e., MUX modularity) needs to be enforced so as to accurately model the network requirements.

The MUX level modularity requirement may be better understood by the following example. Consider an OC-48, 2-fiber BLSR ring where the high speed working capacity slots on a ring span are numbered 1, 2, . . . , 24. The slots can be partitioned as two OC-12 portions as slots 1-12 and 13-24. Similarly, each OC-12 portion may be further partitioned into four OC-3 partitions thereby giving rise to eight such partitions in total: slots 1-3; slots 4-6; slots 7-9; slots 10-12; slots 13-15; slots 16-18; slots 19-21; and slots 22-24. Suppose on this ring span, if slots 1, 4, 7, 8 and 13-24 are already in use, then the available OC-3 capacity is only one because only one OC-3 partition is completely free, i.e., slots 10-12. Thus, the available capacity for supporting OC-3 demands, on this span, is one. MUX modularity, accordingly, is the number of available partitions on a ring span having contiguous slots whose size at least equals the demand MUX level.

In accordance with the teachings of the present invention, MUX modularity is implemented for all demand MUX levels by adopting the following rules:

1. The MUX level of a ring should be greater than or equal to the MUX level of demand set being considered. Thus, for example, an OC-48 demand can ride only on OC-48 4-fiber BLSR, OC-192 2-fiber ring, OC-192 4-fiber BLSR, OC-48 1+1 and OC-192 1+1 rings).
2. With respect to rings that do not qualify the MUX modularity rule above, their span capacities are set to zero.
3. The capacities of ring spans are converted or decomposed to equivalent units in terms of the MUX level of the demand. Thus, for example, an OC-48 1+1 ring can support at most four OC-12 demands, or 16 OC-3 demands, and so on.
4. In calculating the available capacity for routing, information pertaining to available high speed slots combined with the demand MUX level modularity is used.
5. Preferably, the port usage constraints are factored suitably to reflect equivalent DS-3 drops, if any.

The foregoing guiding principles are captured in the flow diagram at steps 1006, 1009, and 1010, and decision block 1008, effectuated by a suitable modularity structure means (software, hardware, or firmware), in addition to building a suitable network model using appropriately scaled constraint equations (step 1012). The solution set obtained after executing the network model (in step 1014) is analyzed to determine if any potential ADMs have now become existing. Also, if time points are included in the optimization process, the time point of any new ring that has been turned up in the current iteration is set to equal the current time point. Furthermore, specific high speed slot information for each route is generated and used to determine the available ring capacity for the next demand sets in accordance with the MUX modularity constraint. These procedures are embraced in step 1016 of the flow diagram.

If additional demand sets exist (within the current time point or otherwise) (decision block 1018), the network model is updated to the next MUX level (which is lower than the previous MUX level because of the descending order of MUX levels in the demand input structure), taking into account the MUX modularity considerations as set forth above. The updated model is then used as the base model for the next optimization iteration (step 1020). This process is repeated for every MUX level of the demand sets provided as the input. Also, when time points are utilized, the process is repeated for all MUX levels within a time point and for each time point (i.e., dual loop processing).

As mentioned above, in a further aspect, Priority 2 demands may be considered, one at a time, once all Priority 1 demands are optimized. The MUX rules (and the time point rules, if applicable) may be enforced as each demand is routed on the network, ensuring that they cannot trigger new overbuilds and can only use any remaining capacity not used by the Priority 1 demands.

Upon completion of the optimization process, detailed reports are generated that describe, preferably, e.g., demand routes, ring utilization parameters, ADM configurations, et cetera. Thereafter, the control flow of the process stops (step 1022).

As is well known, demands routed on a SONET ring network may conform to two transport technologies: Time Slot Assignment (TSA) or Time Slot Interchange (TSI). Current network optimization techniques, for example, the techniques disclosed in the Fahim patent referenced in this patent application, provide solutions that are TSI-compatible only, although most of the currently deployed networks use the TSA technology. Accordingly, it should be readily understood that solution sets obtained via the existing network optimization techniques provide only approximate results rather than accurate predictors of real-life network deployment and demand routing.

A summary of the technical differences between the TSA and TSI technologies is first set forth below. Thereafter, an exemplary method for providing TSA-based routing in a SONET ring in accordance with the teachings of the present invention is furnished.

Figure 11:
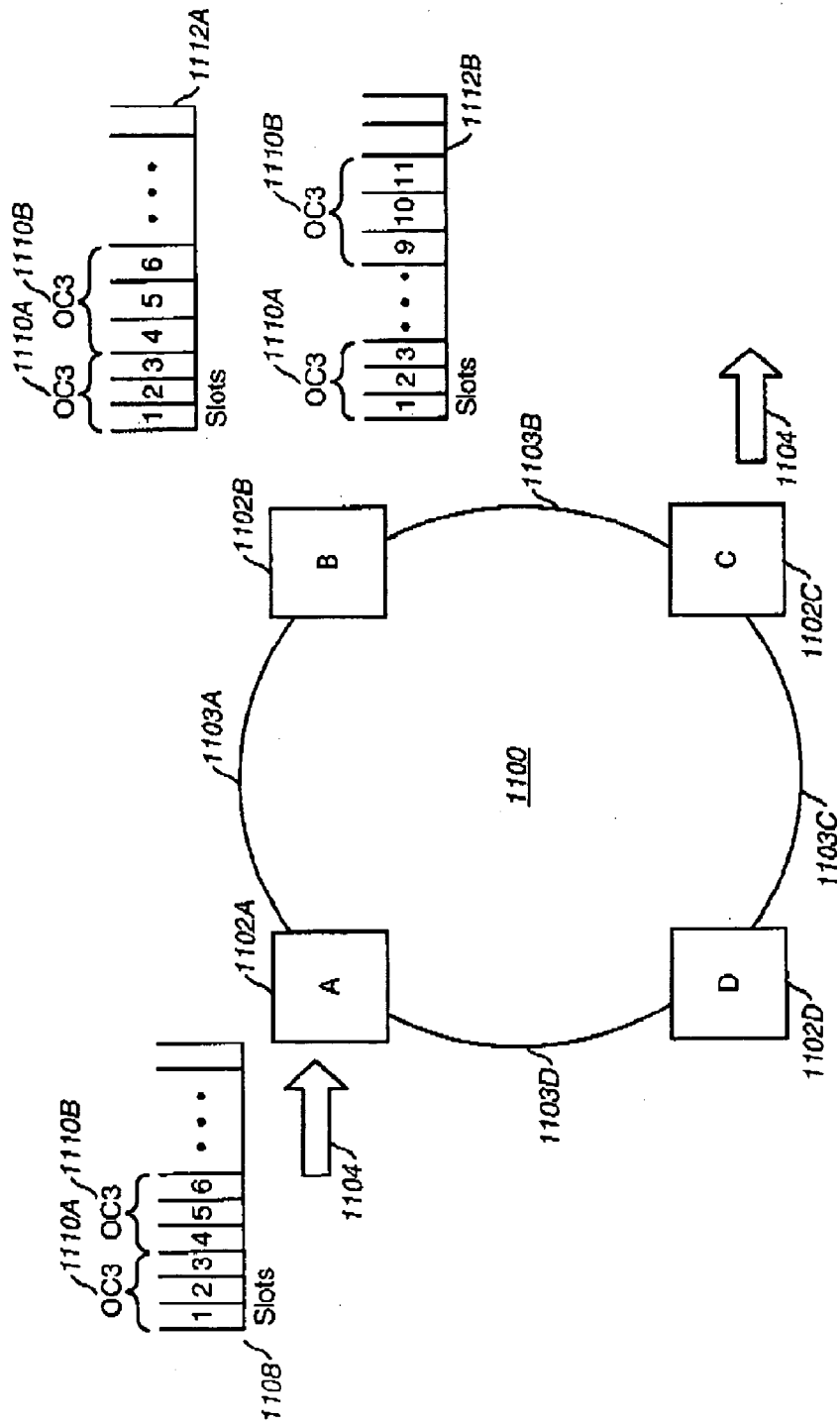
FIG. 11 depicts an exemplary ring illustrating TSA and TSI transport mechanisms for routing demand.

FIG. 11 depicts an exemplary four-node network ring 1100 illustrating TSA and TSI transport mechanisms used for demand routing. Nodes A (reference numeral 1102A) through Node D (reference numeral 1102D) are connected together with spans A-B (reference numeral 1103A), B-C (reference numeral 1103B), C-D (reference numeral 1103C), and D-A (reference numeral 1103D). Node A 1102A and Node C 1102C are provided as demand ingress and egress points, respectively, for illustrative purposes. An incoming demand 1104 comprised of two OC-3 partitions enters the ring at Node A, and travels through spans 1103A and 1103B before exiting the ring 1100 at Node C 1102C.

Suppose that the incoming demand (comprising two OC-3 partitions) occupies high speed slots 1-6 (slots 1-3 for OC-3 portion 1110A and slots 4-6 for OC-3 portion 1110B) on the A-B span 1103A as exemplified in-slot configuration 1108. Under the TSA technology, it is required that on span 1103B the demand ride on the same high speed slots, namely, slots 1-6, as exemplified by slot configuration 1112A. On the other hand, the TSI technology may permit the demand to switch to a different set of slots on the B-C span 1103B. Thus, in this illustrative slot configuration 1112B, OC-3 portion 1110A rides in slots 1-3 and OC-3 portion 1110B rides in slots 9-11, when the demand is being routed over the B-C span using the TSI mechanism.

Figure 12A:
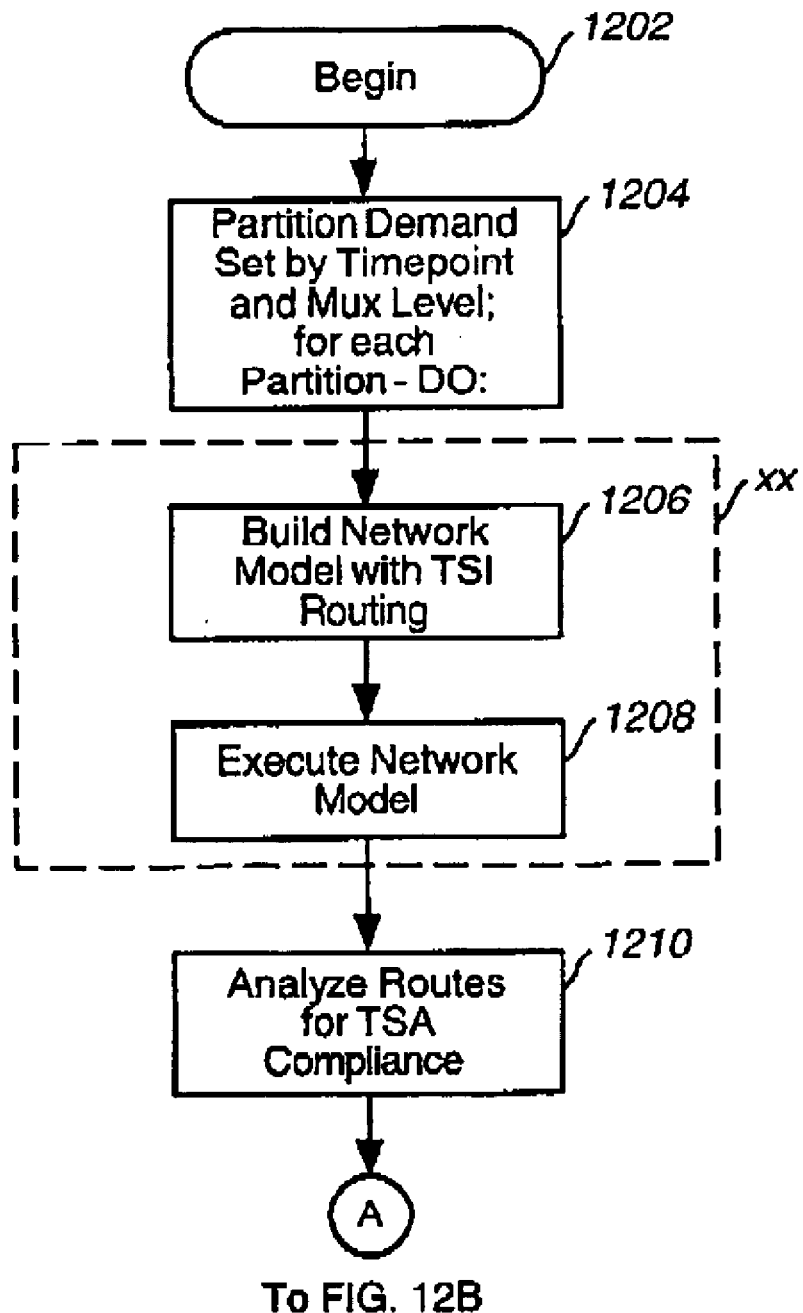
FIGS. 12A-12C depict a flow diagram of an exemplary method for providing TSA-compliant demand routing in a SONET-based Fiber Optic Network.
Figure 12B:
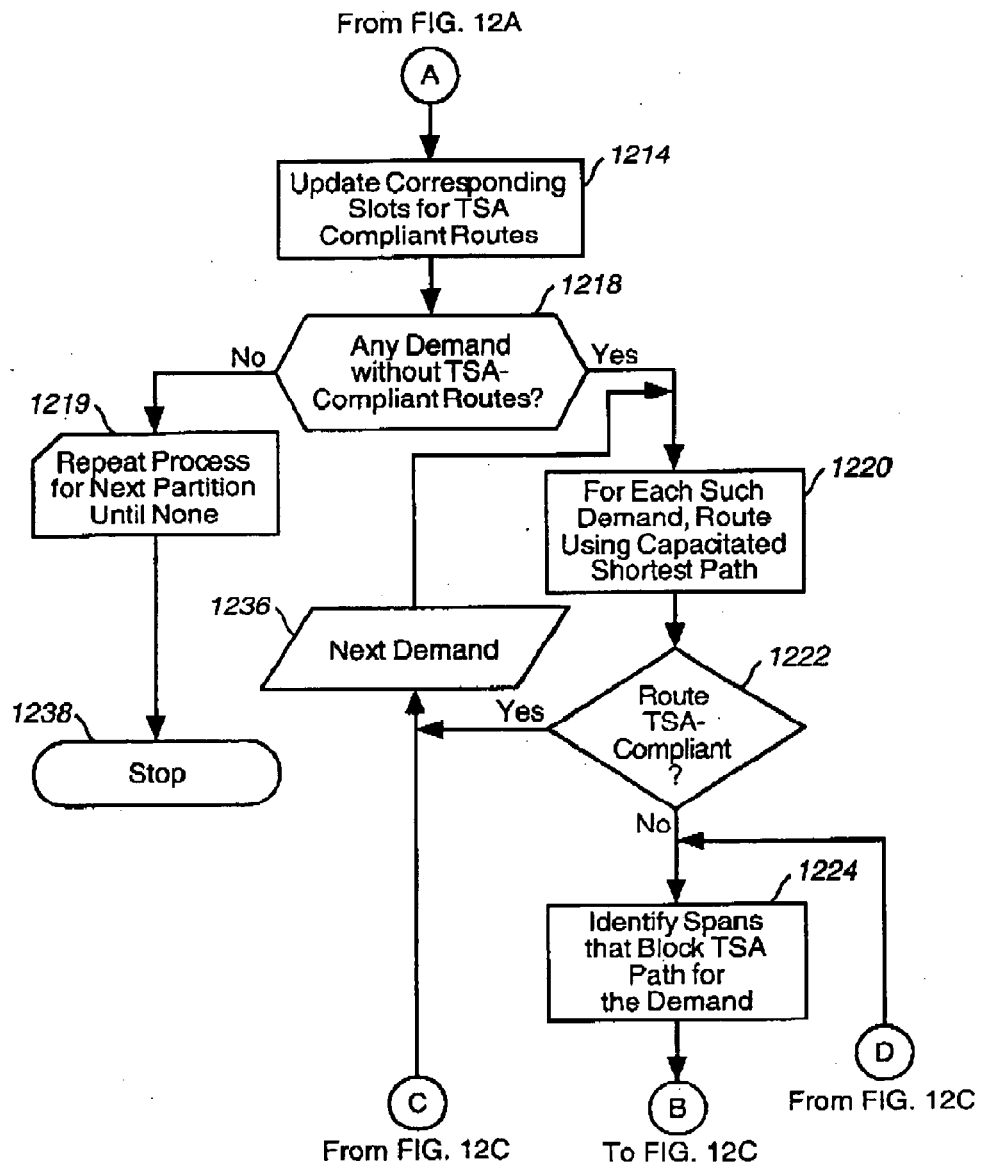
Figure 12C:
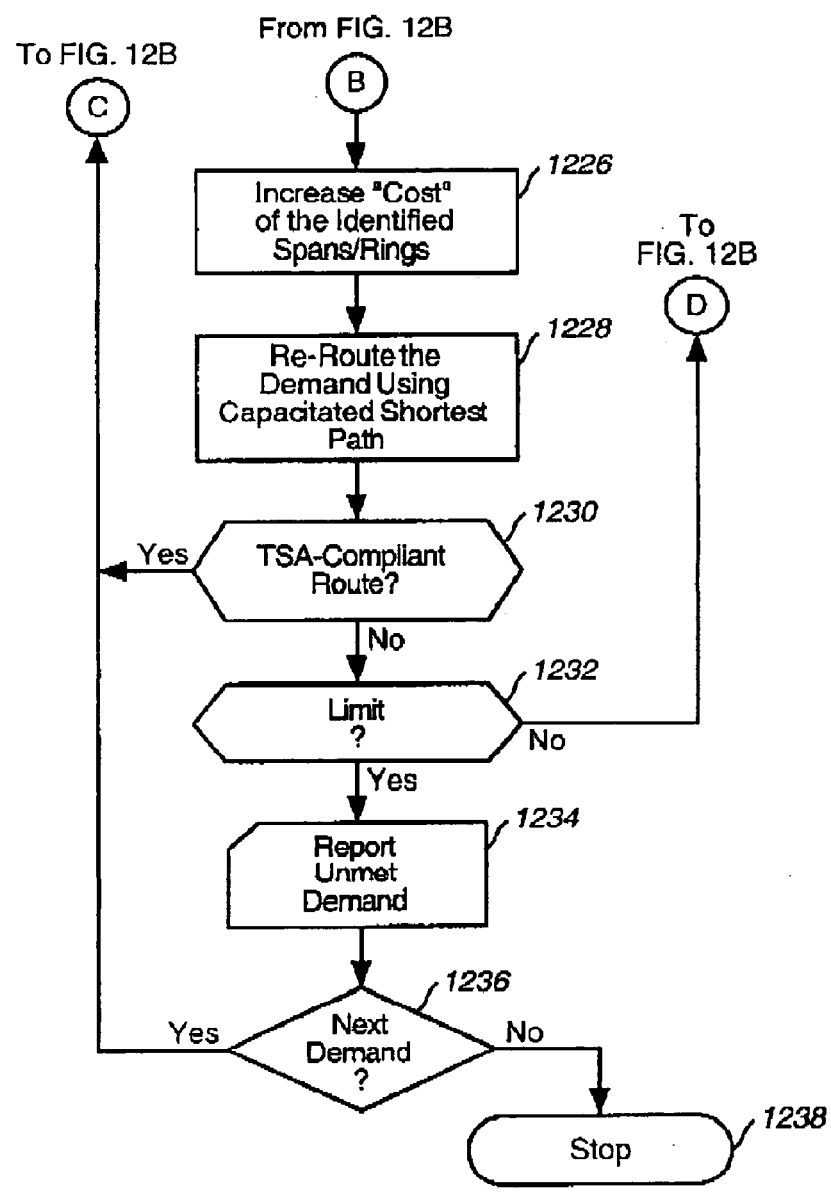

FIGS. 12A-12C depict a flow diagram of an exemplary method for providing TSA-based routing in a SONET-based Fiber Optic Network. Essentially, the optimization process of the present invention provides TSI-compliant solution sets first, preferably using time-point-based and MUX-level-based network optimization procedures discussed hereinabove, and thereafter derives a TSA-compliant solution set from the TSI solution sets. These procedures are embraced in steps 1204, 1206, and 1208. Once a TSI solution is obtained for a demand MUX level at a time point, the routes are analyzed for end-to-end TSA compliance (step 1210). For routes compatible with TSA, the usage of corresponding high speed slots is updated (step 1214). Non-compliant routes are separated for resolution thereafter.

If there are no TSA blocked routes (decision block 1218), the optimization loop commenced in step 1204 is repeated until all the demand partitions are optimally routed on TSA (step 1219) and the process flow stops thereafter (step 1238) with relevant output.

If there are demands with TSA-blocked routes, another process control loop using preferably a capacitated shortest path method is started for routing each such demand, as shown in step 1220. The resultant routing is checked to verify its TSA compliance (decision block 1222). If so, the next TSA-blocked demand is taken up (step 1236) for effectuating a similar routing process. On the other hand, if the resultant routing is sill a TSA-blocked route, as determined by decision block 1222, spans that specifically block the TSA transport in the ring or rings are identified (step 1224). A suitable "cost" function associated with such blocking spans is appropriately increased so that the probability of avoiding such blocks is increased in the next routing iteration (step 1226).

The demand is re-routed thereafter, again preferably using the capacitated shortest path method (step 1228). The resultant routes are again verified for TSA compliance (decision block 1230). If compliant, the next demand is then processed (step 1236).

This process of re-routing for a demand may take place until a limit (e.g., a ceiling on the number of attempts, or a time out mechanism, etc.) is reached (decision block 1232). Upon reaching the limit, the blocked demand is suitably marked (e.g., as "unrouted" or "unroutable" and the like) and so reported (step 1234). Thereafter, the next blocked demand is considered for the re-routing process. After completing the processing of all the demands (they are TSA routed, or marked as unrouted), the optimization process generates suitable reports and stops accordingly (step 1238).

In the foregoing optimization processes of the present invention, the recursive network modeling and execution steps have been cumulatively identified as process block "XX". For example, in the flow diagram depicted in FIGS. 9A-9B, steps 908 and 910 are so identified. Similarly, the cumulative process block XX refers to steps 1012 and 1014 in FIGS. 10A-10B, and to steps 1206 and 1208 in FIGS. 12A-12C.

Essentially, the cumulative process block XX embraces the following components as a model generator and optimization processor:

(I) Transformation of the ring arrangement of a network into multi-nodal directed graph (II) Composing an overall cost function based on inter-nodal links generated by the directed graph;

(III) Composing constraint equations, e.g., flow conservation and linking constraint equations; and (IV) Application of an optimization algorithm to minimize the overall cost function subject to the constraint equations.

Techniques for transforming a ring topology into an associated directed graph in the context of a communications network are discussed in the Fahim patent and are incorporated by reference herein. Once a suitable directed graph model is obtained for a network having ring topologies, steps (II)-(IV) above pose an applied mathematics or mathematical simulation (i.e., modeling) problem in the field of operations research, the construction of which follows certain well established principles that are summarized hereinbelow.

In the mathematical model, "commodity" equates to "demand" for a volume of communications flow as specified by the demand input structures of the present invention. This may be represented as certain number of units of a particular MUX level, e.g., OC-3, OC-12, DS-3, et cetera, or other convenient rate-of-flow units appropriate to communications as well known by a person skilled in the art. In accordance with the teachings of the present invention, two types of decision variables are preferably used in formulating the optimization problem. One type is a non-negative integer value representing a flow quantity of each commodity along each directed arc obtained in the directed graph model of the network ring topology. The other type is an integer decision variable having binary values of 0 and 1, representing the absence or presence of network equipment (e.g., an ADM) at a candidate network site, respectively. These two sets of decision variables are expressed as the following:

$$x_{ij}^k = \text{flow on arc } (i,j); \text{ [range: non-negative integers]} \quad (1)$$

$$y_f = \text{presence of network equipment at a location f;} \\ \text{[range binary values } \{0,1\}] \quad (2)$$

where:

k=commodity identifier;

i,j=node indices for nodes in the directed graph obtained for a network ring topology; and f=index of equipment location site.

In a presently preferred exemplary embodiment of the present invention, the optimization of these variables is posed as an integer programming problem, which is similar to a linear programming problem except that the variables to be optimized have integer values rather than being continuous. Linear programming is well known among those skilled in operations research or similar fields of applied mathematics. A popular technique for obtaining solutions to linear programming problems is the widely known simplex method. Although integer programming is similar to linear programming in purpose and notation, techniques used for solving integer programming problems are somewhat different. By way of example, the "branch-and-bound"

approach, the "search heuristic" approach, etc. are some of the known solution techniques for solving integer programming problems.

To those skilled in integer programming or network programming, a more specific description of the mathematical model used in accordance with the teachings of the present invention is stated as a "fixed-charge multicommodity flow problem wherein fixed charge facilities have a finite capacity". The term "fixed charge" refers, in the context of the present invention, to the one-time cost of installing an ADM at a network site. The finite capacity aspect refers to the limited capacity of each ADM. Finally, the term "multicommodity" refers to the superimposed communications requests, as illustrated, for example, by entries in structures 300A-300C of FIGS. 8A-8C, respectively, that are attempting to pass through shared network elements.

Expressed in the standard minimum form, the integer programming problem to be recursively solved in accordance with the teachings of the present invention is stated as the following:

$$\min \sum_{k \in K} \sum_{(i,j) \in A \cup B} c_{ij} x_{ij}^k + \sum_{f \in F} h_f y_f \quad (1)$$

such that $$\sum_{j \in N} x_{ij}^k - \sum_{l \in N} x_{li}^k = \begin{cases} b_i^k & \text{if } i = O(k) \\ -b_i^k & \text{if } i = D(k) \forall i \in N \text{ and } k \in K \\ 0 & \text{otherwise} \end{cases} \quad (2)$$

$$\sum_{(i,j) \in A} \sum_{k \in K} x_{ij}^k \leq u_f y_f \; \forall f \in F \quad (3)$$

$$\sum_{(i,j) \in B} \sum_{k \in K} x_{ij}^k \leq \alpha_{ij} \; \alpha \in \Gamma$$

and $y_f = 0$ or $1$ where:
A=set of add and drop arcs;
B=set of span arcs;
N=set of nodes;
S=set of commodities;
F=set of site locations for ADMs;
$h_f$=fixed cost of ADM, f∈F;
$c_{ij}$=unit flow cost on (i,j)∈A;
O(k)=origin of commodity k∈S;
D(k)=destination of commodity k∈S;
$b^k$=supply of commodity k∈S;
$u_f$=capacity of ADM, f∈F.

The objective equation (Eq. 3) represents the overall network cost that is to be minimized and comprises a flow cost term and an equipment cost term. The flow cost term is obtained by summing, for all arcs in the model, the product of the commodity flow along each given arc times a per-unit-commodity cost pertaining to the given arc. The equipment cost term is obtained by summing, for all candidate ADM locations, the product of fixed cost of an ADM at the given location times a binary value representing the presence or absence of an ADM.

The constraint equations include a set of flow conservation equations (Eq. 4) and a set of collective flow constraint equations (Eq. 5). The flow conservation equations are posited to ensure that for certain types of nodes in the directed graph, sum of commodity flow-in equals sum of commodity flow-out. Also, these equations ensure that for source and destination nodes, sum of commodity flow along all arcs in the directed graph model is consistent with the total amount of a given commodity entering or exiting the network, respectively. The collective flow constraint equations preferably have two functions in context of the present invention. First, they effectively disallow assignment of commodity to certain arcs in the absence of an associated ADM. Second, they represent real-world capacity limitations by limiting the sum of all commodities flowing along any given arc. In this aspect, the $u_f$ components of the flow constraint equations may vary from one optimization loop to the next, as the network model is recursively re-built when demands with multiple MUX levels are optimized in accordance with the teachings of the present invention.

The minimum form cost function equation and associated constraint equations set forth above are then submitted to an appropriate optimization algorithm which may be, for example, a known integer programming technique or variations thereof, in order to find values of the commodity distribution and equipment-presence variables (i.e., solution set) which minimize cost while satisfying the constraint equations. Accordingly, any known linear or integer programming technique may be utilized for this purpose without affecting the scope and spirit of the present invention.

Analysis of the decision variables, i.e., the x and y variables discussed hereinabove (Eqs. 1 and 2, respectively), yields demand flow and equipment information for interpreting the network routing requirements. For example, when a "0" is obtained for a $y_f$ variable, no ADM equipment is indicated for site f, resulting in a passthrough site in the network ring. The x variables are examined and interpreted to determine the optimum distribution of various commodities along different arcs, which is then translated to the actual parameters that identify rings and ring spans bearing the indicated load in the indicated direction.

As stated in the foregoing Detailed Description, in the course of performing the optimization processes in accordance with the present invention, the network model (i.e., the multi-nodal directed graph model obtained via the transformation process described in the Fahim patent) and the associated mathematical model, i.e., the cost function and related flow constraint equations (cumulatively executable on a suitable computer operating as an optimizer or optimization processor), are recursively updated to encompass the time-dependency and/or the multiple MUX levels of demand quantities.

It should be readily appreciated, based on the foregoing, that the present invention advantageously provides a recursive network optimization solution that is more versatile than the prior art in terms of affording more realistic simulations of the existing networks and demand requests. Accordingly, solution sets generated by the optimization processes of the present invention furnish a better planning tool for network deployment and upgrading. Relatedly, significant cost savings may be realized due to better predictability of equipment placement and replacement in a network.

In addition, it should be further appreciated that more realistic simulations of the present invention yield better efficiencies in terms of overall network capacity utilization. Because the recursive optimization process of the present invention distinguishes between different types of demand Priorities and suitably enforces time point constraints and MUX modularity rules, high speed slots are efficiently utilized and any overcapacity in the network ring is minimized. Moreover, the present invention yields solution sets that are compatible with the TSA transport mechanism that is more ubiquitous in practice.

Further, it is believed that the operation and construction of the present invention will be apparent from the foregoing Detailed Description. While the method and system shown and described have been characterized as being preferred, it should be readily understood that various changes and modifications could be made therein without departing from the scope of the present invention as set forth in the following claims. For example, although the teachings of the present invention have been exemplified using SONET-based networks, it should be apparent that the recursive optimization processes described herein are applicable to other networks that support time-based demand requests and multiple channel capacities. Additionally, the objective equation used in the optimization processes herein may be further refined to include not only an "all-or-none" equipment cost term (i.e., the one-time fixed charge), but also depreciation costs with suitable amortization schedules. Furthermore, as mentioned briefly hereinabove, the teachings of the present invention may be practiced without any limitation as to the exact type of linear or integer programming technique. Also, the exemplary optimization processes of the present invention may preferably be implemented in a computing environment based on a client-server architecture, wherein the optimization processor and model generator reside on a server that receives suitable demand data inputs from known computer-readable media and generates appropriate reports etc. for client stations. Accordingly, it should be clearly understood that these and other variations, substitutions, additions, re-arrangements and modifications are contemplated to be within the ambit of the present invention whose scope is solely limited by the claims set forth below.

What is claimed is:

1. A planning method for optimally deploying network equipment in a network over a period of time, said network including a span disposed between at least two sites, the method comprising:
    providing a demand input structure having a plurality of demands to be serviced by said network, each of the demands being associated with a corresponding time point and a demand quantity indicating units of communication capacity;
    sorting said plurality of demands by their time points;
    starting with a set of the demands having an earliest time point;
    transforming said network into a network model including a multi-nodal directed graph having a plurality of arcs, said transforming being based on a topology of said network;
    optimizing the routing of said set of demands using said multi-nodal directed graph and a cost function associated therewith;
    obtaining network equipment placement information and demand routing information based on said optimizing of the routing of said set of demands;
    updating said network model and said cost function associated therewith based on said network equipment placement information and said demand routing information;
    repeating said optimizing, said obtaining, and said updating for remaining time points provided in said demand input structure, using said updated network model and cost function to optimize the routing of the remaining demands associated with said time points; and
    outputting a network equipment deploying solution based on the updated network model and the cost function associated therewith when all time points have been processed.

2. The planning method of claim 1, further comprising:
    scheduling successive deployment of said network equipment in said network based on said network equipment placement information obtained for each of said time points.

3. The planning method of claim 1, wherein each of said plurality of demands is associated with a selected communications channel rate between said sites.

4. The planning method of claim 3, wherein said selected communications channel rate is the same for each of said plurality of demands.

5. The planning method of claim 3, wherein said selected communications channel rate is different for said plurality of demands.

6. The planning method of claim 1, wherein said demand input structure comprises a data structure residing in a computer-readable medium device.

7. The planning method of claim 1, wherein said plurality of demands comprises a portion of higher priority demands and a portion of lower priority demands.

8. The planning method of claim 7, wherein said transforming, said optimizing, said obtaining, and said updating are performed first for optimizing said portion of higher priority demands.

9. The planning method of claim 8, further comprising optimizing said portion of lower priority demands by using a capacitated shortest path algorithm with respect to each of said lower priority demands.

10. The planning method of claim 1, wherein said network equipment placement information comprises an indication of the presence of an Add/Drop Multiplexer at a selected site.

11. The planning method of claim 1, wherein said network equipment placement information comprises an indication of the absence of an Add/Drop Multiplexer at a selected site.

12. The planning method of claim 1, wherein said cost function comprises a flow cost term and an equipment cost term.

13. The planning method of claim 1, wherein said optimizing is performed by employing an integer programming technique.

14. The planning method of claim 1, wherein said multi-nodal directed graph is derived from a ring structure associated with said network.

15. The planning method of claim 1, wherein the demand quantity indicates a particular multiplexer level.

16. The planning method of claim 1, wherein said optimizing further comprises sorting the plurality of demands by corresponding ones of the demand quantities.

17. The planning method of claim 16, wherein said sorting is performed in descending order based on the corresponding ones of the demand quantities.

18. The planning method of claim of claim 1, wherein said optimizing further comprises providing a time-slot-assignment-compliant solution set.

19. The planning method of claim 18, wherein said time-slot-assignment-compliant demand routing is derived from at least one time-slot-interchange-compliant solution set.

* * * * *